3,205,273
PREPARATION OF NITROSOALKANES

Pat W. K. Flanagan, Ponca City, Okla., assignor to Continental Oil Company, Ponca City, Okla., a corporation of Delaware
No Drawing. Filed Jan. 24, 1964, Ser. No. 339,882
13 Claims. (Cl. 260—647)

This invention relates to the preparation of nitrosoalkane, both the monomeric and dimeric forms.

Gowenlock and Trotman, J. Chem. Soc., 1670 (1956), prepared nitrosoalkane dimers by the vapor phase pyrolysis of alkyl nitrites. Emmons, J. Amer. Chem. Soc., 79, 6522 (1957), prepared nitrosoalkane dimers by oxidation of imines with peracetic acid. These methods are laborious and costly.

It has been discovered that nitrosoalkane dimers can be prepared as the product of (1) the reaction of nitrosyl chloride and trialkylaluminum, or dialkylaluminum halide, or dialkylaluminum alkoxide at temperatures below about +40° C., in the presence of an inert, liquid, organic solvent; followed by (2) hydrolysis, at moderate temperature, of the product of (1).

Nitrosyl chloride (nitrogen oxychloride) is reacted with alkylaluminum; the alkylaluminum is either trialkylaluminum, dialkylaluminum halide, or dialkylaluminum alkoxide or mixtures thereof. It is preferred to charge the reactants in a mole ratio of nitrosyl chloride to alkyl groups in the alkylaluminum of at least about one—normally a small excess of the nitrosyl chloride is present.

The reaction proceeds with any carbon number alkyl group and configuration of the group. The straight chain alkyl aluminum are an especially suitable reactant, e.g., the growth product of triethylaluminum and ethylene.

The nitrosoalkane can be reduced to amines Kharasch et al., J. Org. Chem. 22, 37 (1957). They can be oxidized to nitroalkanes Encyclopedia of Chemical Technology, 9, 387 (1950). Alkyl groups and particularly n-alkyl groups, having 1–40 carbon atoms and desirably, 2–22 carbon atoms, are of especial interest when the nitrosoalkane product is to be used for amine or nitroalkane preparation.

Illustrative alkylaluminums are: trimethylaluminum, triethylaluminum, tri(n-dodecyl)aluminum, tri(n-octadecyl)aluminum, tri(docosyl)aluminum; tri(tetracontyl)aluminum, diethyl aluminum chloride, dioctylaluminum bromide, di(n-dodecylaluminum ethoxide, and di(docosyl) aluminum butoxide.

The reaction is carried out in the presence of an inert, liquid organic solvent to permit intimate contact between the reactants. Particularly suitable solvents are: ethers such as alkyl ethers, aromatic ethers, aryl alkyl ethers, cycloalkyl ethers, and heterocyclic ethers; hydrocarbons such as paraffins, cycloparaffins, and aromatic; and the pyridines. Illutrative solvents are ethyl ether, tetrahydrofuran, cyclohexyl ether, hexane, toluene, cyclohexane, and pyridine.

The nitrosyl chloride reaction is carried out at a temperature below about +40° C.; temperatures of −70° C. and lower may be used with the proper solvent system. In general, temperatures between about −30° C. and +20° C. are employed.

It is preferred to add the alkylaluminum incrementally to a stirred body of nitrosyl chloride and solvent; the addition helps in maintaining the body at the desired reaction temperature. At low enough temperatures liquid nitrosyl chloride can be added to the solvent-alkylaluminum. The reaction is rapid at all temperatures and rapid addition of the reactant to the body of other reactant is feasible. The total time of addition is dependent on the amounts of reactants and the temperature. It is preferred to have the total reaction time as short as temperature control permits—shorter times appear to favor higher yield. Commonly the addition time is about 2–90 minutes and preferably is less than about 15 minutes.

The nitrosoalkane dimer is obtained by hydrolysing the reaction product mixture at a moderate temperature; ordinarily between about 0° C. and +40° C. The hydrolysis agent and the reaction product mixture are intermingled for a time sufficient to complete hydrolysis. Usually the hydrolysis produces a precipitate which includes the product dimer. It is preferred to use an acidic hydrolysis agent.

It has been found that the yield of dimer is greatly influenced by the age of the reaction product mixture. Maximum yields are obtained by adding the hydrolysis agent to the reaction product mixture substantially immediately after all the reactants are charged or after a reasonable reaction time, when all the reactants are intermingled at one time.

Preferably the hydrolysate is extracted with an inert, liquid organic solvent to remove the dimer product. Ordinarily all the dimer product has been extracted when the precipitate has disappeared. The extraction is carried out at a moderate temperature, i.e., below about +40° C. The dimer may be recovered from solution by distilling away the solvent or by concentrating the solution followed by freezing the solid dimer out of solution.

ILLUSTRATIONS

The process of the invention is demonstrated by the following illustrative embodiments. The tri(n-dodecyl) aluminum was prepared by a displacement reaction of triisobutyl aluminum and dodecene.

No. 1

A 100 ml. flask was fitted with a thermometer, a dropping funnel and a gas inlet tube. The flask was charged with 25 ml. of tetrahydrofuran in an atmosphere of nitrogen. Nitrosyl chloride (4.0 ml. of liquid, 5.6 g., 0.085 mole) was vaporized in with cooling. The flask was cooled to −10° and tridodecylaluminum (20 ml., 85% pure, 14.20 g., 0.080 mole of alkyl) was added slowly. A mole ratio of NOCl/alkyl group of 1.06. As soon as addition was started the flask was immersed in a Dry Ice/hexane bath. The rate of addition was controlled to keep the temperature at −10°. Addition was completed in 4 minutes.

The reaction product mixture was immediately poured into a cooled, stirred mixture of 100 ml. of 10% hydrochloric acid and 150 ml. of hexane. A white precipitate formed. The hydrolysate was extracted with warm hexanediethyl ether mixture until the precipitate was completely dissolved. The combined organic extracts were reduced to about one liter and then cooled to −10° to freeze out a solid product which was filtered off. The product was trans-bis(1-nitrosododecane) (9.02 g., 57% yield), M.P. 75–77° (uncorr.), reported, M.P. 76–78°. The infrared spectrum showed a characteristic multiplet centered around the strongest band at 8.05 mu.

No. 2

Another run was made under the conditions of Run No. 1, except that the total addition time was stretched out to 70 minutes. The yield of dimer was 22%.

No. 3

Another run was made under the conditions of Run No. 1, except that the reaction temperature was held at +10° C. and the addition time was 3 minutes. A yield of 48% of the bis(2-nitrosododecane) was obtained.

No. 4

This run was made under the conditions of Run No. 1, except that ethyl ether was used as the reaction mixture solvent. The yield of dimer product was 42%.

No. 5

A run was made according to the procedure of Run No. 1 using ethyl ether and pyridine solvent at −45° C. and an addition time of 45 minutes. A 22% yield of dimer was obtained.

No. 6

Nitrosyl chloride and di(n-dodecyl)aluminum ethoxide (1.06 ratio) were reacted in ethyl ether solvent at −50° C. and 60 minutes addition time of the ethoxide. Hydrolysis and dimer recovery followed the procedure of Run No. 1. The yield of dimer was 21%.

No. 7

Nitrosyl chloride and tri(n-dodecyl)aluminum (1.06 ratio) were reacted in ethyl ether solvent at −40° C. and 90 minutes addition time. Then the reaction product mixture was stirred overnight; this was then hydrolyzed and extracted following the procedure of Run No. 1. The yield of dimer was very low—ca. 1%.

Thus having described the invention what is claimed is:

1. A process for preparing nitrosoalkane dimer which process comprises:
   reacting nitrosyl chloride and alkylaluminum selected from the class consisting of trialkylaluminum, dialkylaluminum halide and dialkylaluminum alkoxide;
   at a temperature below about +40° C. with intimate intermingling of said reactants;
   in the presence of an inert, liquid, organic solvent; and treating the reaction product mixture with a hydrolyzing agent at moderate temperature to produce nitrosoalkane dimer.

2. The process of claim 1 wherein the mole ratio of nitrosyl chloride to alkyl groups is at least about 1.

3. The process of claim 1 wherein each alkyl group and each alkoxy group has 1–40 carbon atoms.

4. The process of claim 1 wherein said reaction temperature is between about −30° C. and about +20° C.

5. The process of claim 1 wherein said temperature of hydrolysis is between about 0° C. and about +40° C.

6. The process of claim 1 wherein said reactant is tri(n-dodecyl)aluminum and said dimer is trans-bis(1-nitrosododecane).

7. A process for preparing nitrosoalkane which process comprises:
   adding, over a period of time, alkylaluminum to an agitated solution of nitrosyl chloride and inert, liquid, organic solvent, at a temperature between about −70° C. and about +40° C., where said alkylaluminum is selected from the class consisting of trialkylaluminum, dialkylaluminum halide, and dialkylaluminum alkoxide, having 1–40 carbon atoms in each alkyl group;
   substantially immediately after all of said alkylaluminum has been added, adding, at a temperature between about 0° C. and about +40° C., a hydrolyzing agent to said reaction mixture to produce the corresponding nitrosoalkane dimer; and
   recovering nitrosoalkane dimer product from said hydrolysate.

8. The process of claim 7 wherein said solvent is selected from the class of ethers, hydrocarbons, and pyridines.

9. The process of claim 8 wherein said solvent is tetrahydrofuran.

10. The process of claim 8 wherein said solvent is ethyl ether.

11. The process of claim 8 wherein said solvent is hexane.

12. The process of claim 7 wherein said alkylaluminum is tri(n-dodecyl)aluminum and said nitrosoalkane dimer is trans-bis(1-nitrosododecane).

13. A process for preparing nitrosoalkane dimer which process comprises:
   adding, over a period of about 2–90 minutes, to an agitated solution of nitrosyl chloride, tri(n-dodecyl)aluminum and tetrahydrofuran solvent, at a temperature between about −30° C. and about +20° C.;
   substantially immediately after all the tri(n-dodecyl)aluminum has been added, adding to said reaction mixture, at a temperature of about 0° C. and about +20° C., an acidic hydrolyzing agent to produce bis(1-nitrosododecane); and
   recovering said bis(1-nitrosododecane) from said hydrolysate by solvent extraction thereof.

No references cited.

CARL D. QUARFORTH, *Primary Examiner.*